United States Patent [19]

Rosenfeld

[11] Patent Number: 4,644,103
[45] Date of Patent: Feb. 17, 1987

[54] TONE-RESPONSIVE CIRCUIT FOR ACTIVATING AN INSTRUMENTALITY INTERFACING SYSTEM

[75] Inventor: Yechiel Rosenfeld, Yardley, Pa.

[73] Assignee: Base Ten Systems, Inc., Trenton, N.J.

[21] Appl. No.: 740,972

[22] Filed: Jun. 4, 1985

[51] Int. Cl.[4] .............................................. H04M 1/00
[52] U.S. Cl. ...................................... 379/42; 379/104
[58] Field of Search ................ 179/70, 77, 81 R, 2 A

[56] References Cited

U.S. PATENT DOCUMENTS

| | | | |
|---|---|---|---|
| 3,789,803 | 2/1974 | Davis et al. | 179/81 R |
| 4,088,843 | 5/1978 | Rogers et al. | 179/70 |
| 4,360,710 | 11/1982 | Chaput et al. | 179/81 R |
| 4,388,498 | 6/1983 | Geboers et al. | 179/81 R |
| 4,408,153 | 10/1983 | Terry | 179/81 R |
| 4,492,823 | 1/1985 | James et al. | 179/81 R |
| 4,506,112 | 3/1985 | Bitsch | 179/81 R |
| 4,532,382 | 7/1985 | Pommer, II | 179/81 R |

Primary Examiner—Gene Z. Rubinson
Assistant Examiner—David R. Schuster
Attorney, Agent, or Firm—Weiser & Stapler

[57] ABSTRACT

In activating a unit for monitoring a remote instrumentality, a tone-responsive circuit operates in accordance with an established duty cycle wherein, for a major portion of each cycle, current is drawn from the telephone lines servicing the system at a rate which is within the range permitted by prevailing telephone regulations, to charge a capacitor over time, and wherein, for a minor portion of each cycle, the charge stored by the capacitor is used to briefly operate a tone detection circuit which is capable of determining whether or not the remote instrumentality is being interrogated. If no such tones are detected, the circuit continues its periodic operation as previously described. If tones indicating a desired interrogation are detected, the tone-responsive circuit activates the monitoring unit which is used to poll the instrumentality.

20 Claims, 8 Drawing Figures

TONE-RESPONSIVE CIRCUIT FOR ACTIVATING AN INSTRUMENTALITY INTERFACING SYSTEM

BACKGROUND OF THE INVENTION

The present invention relates generally to systems for accessing various remote instrumentalities, and in particular, to a circuit for selectively activating a unit capable of interfacing with the instrumentality responsive to detected tones.

Recently, there has been significant interest in the development of systems for interrogating various remote instrumentalities to obtain desired information without requiring personnel to travel to the remote location at which these instrumentalities are stationed. One general class of remote interrogation involves the detection of alarms indictating that the instrumentality in question has undergone a certain change in state. This change in state may signify any of a number of alarm conditions such as a fire, an unauthorized entry, the departure from specified norms, the measurement of a specified parameter, etc. Another general class of remote interrogation involves the accessing of meters and other information gathering devices. This may include the accessing of electric meters, gas meters and others, as well as devices for monitoring any of a number of parameters including flow rates, temperatures, pressures, etc.

Generally, such interrogations are accomplished by transmitting a tone or group of tones to the instrumentality to be accessed, so as to cause the instrumentality to read the parameter or parameters which it monitors, and to transmit this information to the source of the interrogation signal. Ordinarily, these operations occur over telephone lines, since this eliminates the need to run separate lines between the source of the interrogation signal and the remote instrumentality. However, this has the disadvantage of subjecting such operations to the regulations imposed upon, and imposed by, the various telephone companies involved. One such regulation, with which the present invention primarily concerns itself, relates to the use of current from telephone lines to operate associated equipment.

Various regulations place specific limits on the amount of power which can be drawn from a telephone line, so as to avoid an unacceptable interruption in telephone service, and so as to enable the fault detection circuitry which is conventionally used by many telephone companies to operate correctly. When a telephone line is placed in service (the so-called "off-hook" condition), sufficient amounts of current may generally be drawn from the telephone line to operate most available remote monitoring devices. However, this requires continued occupation of the accessed telephone line during these periods, which is often unacceptable, and at times impossible, since the transmission of speech and data communications must not be affected by such ancillary equipment. When the telephone line is not in service (the "on-hook" condition), prevailing regulations generally severely limit the amount of current which may be drawn from the telephone line, often to only several microamps, which is generally insufficient to operate most presently available remote monitoring devices.

In many cases, the remote monitoring device forms part of a requested service, or a service to which a customer subscribes. In providing services of this type, the customer receives the benefit of the service and expects the service to be performed. Accordingly, the company which provides the service is generally able to rather freely access the customer's power lines, which avoids the need to deal with the above-discussed constraints.

However, in connection with certain types of meter reading equipment, the remote monitoring device is operated for the convenience of a utility or some other third party, and not for the convenience of the customer in possession of the premises at which the remote instrumentality is stationed. Since these operations are for the convenience of a third party, and not the customer, federal regulation prohibits such systems from drawing power from the customer's premises. Accordingly, the only available source of power for operating the remote monitoring device is often the telephone lines which enable communication between the interrogation system and the remote instrumentality being interrogated, subjecting the third party to the above-discussed constraints. Moreover, since access to the customer's telephone lines is then rather limited (generally to off-peak hours), and since ringing of the customer's telephone is to be avoided, the normally on-hook monitoring device will generally not receive sufficient current to operate as required.

It therefore has become desirable to develop a means for operating a system for the remote interrogation of an instrumentality which is capable of drawing necessary operating current from the telephone line over which such communications take place, eliminating the need to draw current from the premises at which the remote instrumentality is stationed, yet which is capable of doing so without drawing more current than is permitted by present regulations in this regard.

SUMMARY OF THE INVENTION

It is therefore a primary object of the present invention to provide an improved system for remotely interrogating an instrumentality by means of telephone lines.

It is also an object of the present invention to provide a system for remotely interrogating an instrumentality by means of telephone lines, which does not require power to be drawn from the premises at which the remote instrumentality is stationed.

It is also an object of the present invention to provide a system for remotely interrogating an instrumentality wherein all power necessary to the interrogation is drawn from the telephone lines which service the system.

It is also an object of the present invention to provide a system for remotely interrogating an instrumentality which is capable of drawing its operating power from the telephone lines servicing the system, without exceeding maximum current limits as prescribed by prevailing regulations.

It is also an object of the present invention to provide a system for remotely interrogating an instrumentality which is capable of providing these advantages, yet which is simple and reliable in operation.

These and other objects are achieved in accordance with the present invention by providing a tone-responsive circuit which operates in accordance with an established duty cycle wherein, for a major portion of each cycle, current is drawn from the telephone lines servicing the system at a rate which is within the range permitted by prevailing telephone regulations, to charge a capacitor over time, and wherein, for a minor portion of each cycle, the charge stored by the capacitor is used to briefly operate a tone detection circuit which is capable of determining whether or not the remote instrumentality is being interrogated. If no such tones are detected, the circuit continues its periodic operation as previously described. If tones indicating a desired interrogation are detected, the tone-responsive circuit activates the monitoring unit which is used to poll the instrumentality. In activating the monitoring unit, the telephone line which services the system is briefly caused to assume its off-hook condition, to permit the monitoring unit to draw sufficient power from the telephone lines to briefly (and presumably unobtrusively) operate in its desired fashion, and to prevent incoming calls from being placed on the line so as to permit a brief, yet uninterrupted transaction. After transmitting the desired information to the source of the interrogation signals, the remote monitoring unit is deactivated and the tone-responsive circuit is returned to its initial condition, to again assume its intermittent function as previously described.

For further details regarding a tone-responsive circuit in accordance with the present invention, reference is made to the following detailed description, taken in conjunction with the following illustrations.

BRIEF DESCRIPTION OF THE DRAWINGS

In the several views provided, like reference numerals denote similar structure.

DETAILED DESCRIPTION OF A PREFERRED EMBODIMENT

Figures 1, 2:
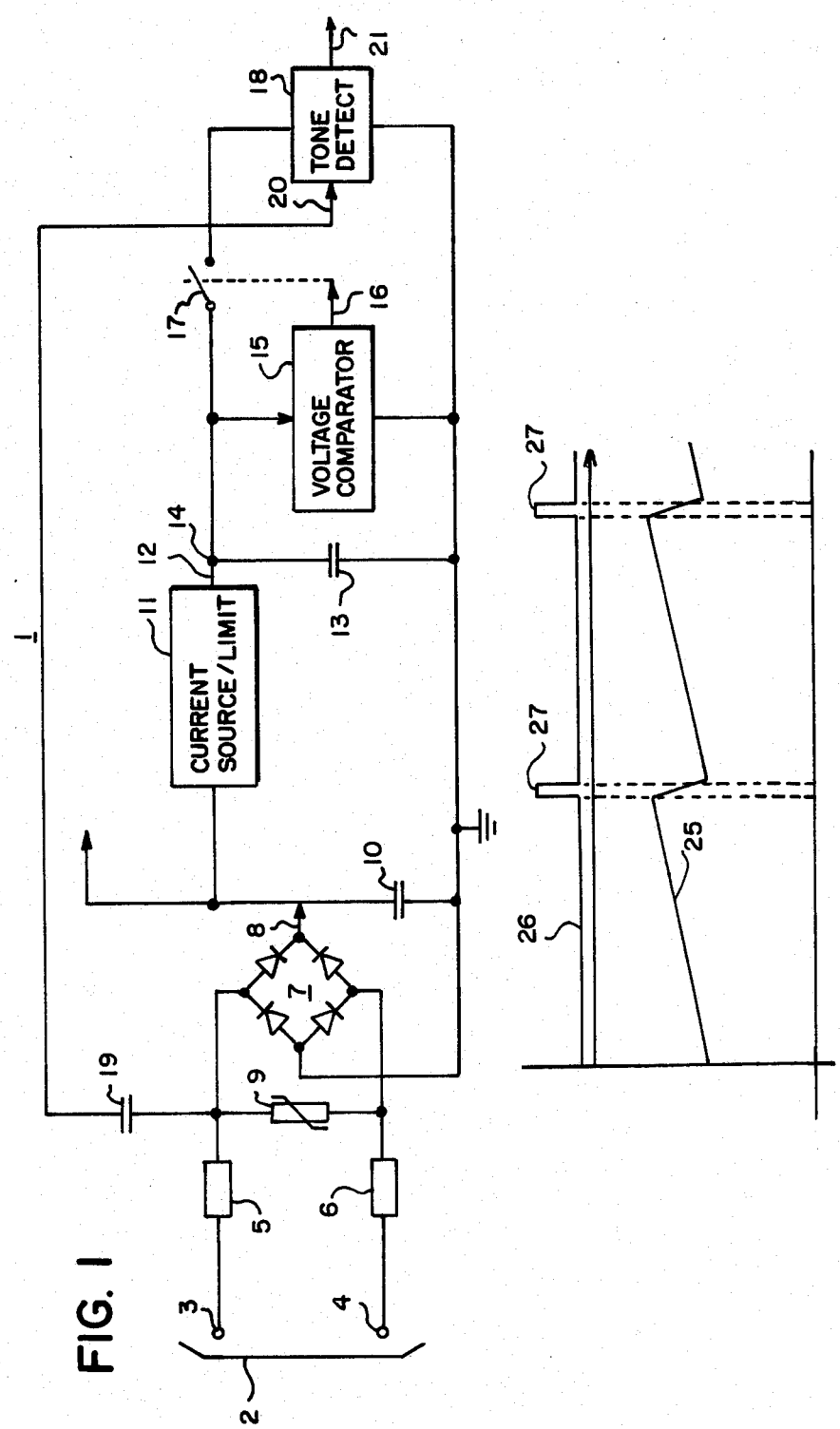
FIG. 1 is a block diagram illustrating a tone-responsive circuit in accordance with the present invention.
FIG. 2 is a timing diagram illustrating waveforms representative of operation of the circuit shown in FIG. 1.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates a tone-responsive circuit 1 in accordance with the present invention. Tone-responsive circuit 1 receives its input from an available telephone line 2, incorporating tip 3 and ring 4 terminals which are applied across the telephone line 2 in accordance with recognized practices. Resistors 5, 6 define a load across the telephone line 2, and operate in combination with a full wave rectification circuit 7, which serves as a means for polarity correction, to supply appropriate currents at terminal 8. A lightning arrestor 9 bridges resistors 5, 6 to protect the circuit 1 from external conditions involving the telephone line 2. Capacitor 10 is provided to further isolate the circuit 1 from transients.

The current developed at terminal 8 is applied to a current source sub-circuit 11 which serves to provide a closely regulated and constant current at 12 irrespective of variations in the voltage developed at the terminal 8. Current source sub-circuit 11 is configured to limit the current drawn from the terminal 8 to a value which will satisfy presently existing telephone company regulations. Specifics regarding such limits will be indicated below. A capacitor 13 couples the output 12 of the current source sub-circuit 11 to ground, and accordingly serves as a storage element which exhibits a specified voltage excursion, at 14, which proceeds in accordance with the regulated circuit which is supplied at the output 12 of the current source sub-circuit 11, and the capacitance of the capacitor 13.

Terminal 14 is further coupled to ground by means of a charge voltage comparator sub-circuit 15. Charge voltage comparator sub-circuit 15 is configured to monitor the voltage excursion exhibited at terminal 14, and to determine when the voltage developed across the capacitor 13 has reached a specified triggering voltage. Upon sensing this triggering voltage, charge voltage comparator sub-circuit 15 provides an output, at 16, which serves to activate (close) a normally open switch 17. In this manner, the voltage developed at terminal 14 is coupled through switch 17 to a tone detect sub-circuit 18 responsive to the voltage excursion exhibited at the terminal 14. This enables tone detect sub-circuit 18 to momentarily search for tones indicative of a desired interrogation. To this end, a capacitor 19 serves to couple the input of the circuit 1 through to the input 20 of the tone detect sub-circuit 18.

In the event that the appropriate tones are detected, tone detect sub-circuit 18 provides an output at 21 which is used to initiate an interrogation process which will be more fully described below. In the event that the appropriate tones are not detected, deterioration of the voltage exhibited at terminal 14 will eventually cause the output 16 of the charge voltage comparator sub-circuit 15 to be removed from the switch 17, allowing the switch 17 to return to its normally open state and returning the circuit 1 to its original condition. In such case, the capacitor 13 will once again be charged until the triggering voltage is reached, which will serve to periodically repeat the process as previously described, until such time as the desired tones are detected.

Accordingly, the circuit 1 serves to periodically check the telephone line 2 with which the circuit 1 is associated to determine whether or not tones indicative of a desired interrogation have been received. This periodic check proceeds according to the charging characteristics of the capacitor 13, the current provided at the output 12 of the current source sub-circuit 11, as well as the triggering voltage (e.g. 4.5 to 5.5 V) which is to cause a change in state of the charge voltage comparator sub-circuit 15, such that the capacitor 13 is periodically charged and discharged in accordance with the curve 25 illustrated in FIG. 2. Applying this periodic waveform to the charge voltage comparator sub-circuit 15 causes the tone detect sub-circuit 18 to operate in accordance with the curve 26 illustrated in FIG. 2, defining a window 27 within which the tone detect sub-circuit 18 operates to determine whether or not an interrogation has been called for. This window is preferably on the order of 60 to 200 milliseconds. Longer samplings are generally to be avoided in order to maximize to number of instrumentalities which can be interrogated within a given period of time.

It will be noted that, to this point, the circuit 1 operates without requiring an external source of current. Rather, the capacitor 13 periodically serves as a source of current which is sufficient to achieve the desired tone detection. To this end, it is preferred that the circuit components which develop the above-described functions be micro-power elements, to assure that the capacitor 13 is capable of providing sufficient current to operate the circuit 1.

In the event that the requisite tones are not detected, the circuit 1 continues its searching function. During this searching, an acceptably low current is drawn from the associated telephone line 2. In the event that the requisite tones are detected, tone detect sub-circuit 18 serves to activate circuitry, as will be described more fully below, which is to accomplish the desired interrogation. In so doing, steps are taken to place the accessed telephone line 2 in its off-hook condition, which accomplishes two tasks. First, this places the instrumentality to be interrogated in communication with the interrogation unit, via the telephone system, enabling the instrumentality to be accessed in appropriate fashion. Second, once placed in the off-hook condition, pertinent telephone company regulations no longer constrain the current which can be drawn from the telephone line 2 to its nominal on-hook value, enabling much greater currents to be drawn from the accessed telephone line. This increased current supply is withdrawn at 29, and is sufficient to supply the monitoring unit which is used to interrogate the instrumentality. After completion of the interrogation, this increased current draw is discontinued and the circuit 1 is returned to its quiescent state, periodically searching for a renewed interrogation. At this time, the monitoring unit is also returned to its quiescent state, so as to keep occupation of the customer's telephone line to an acceptable minimum.

Figure 3:
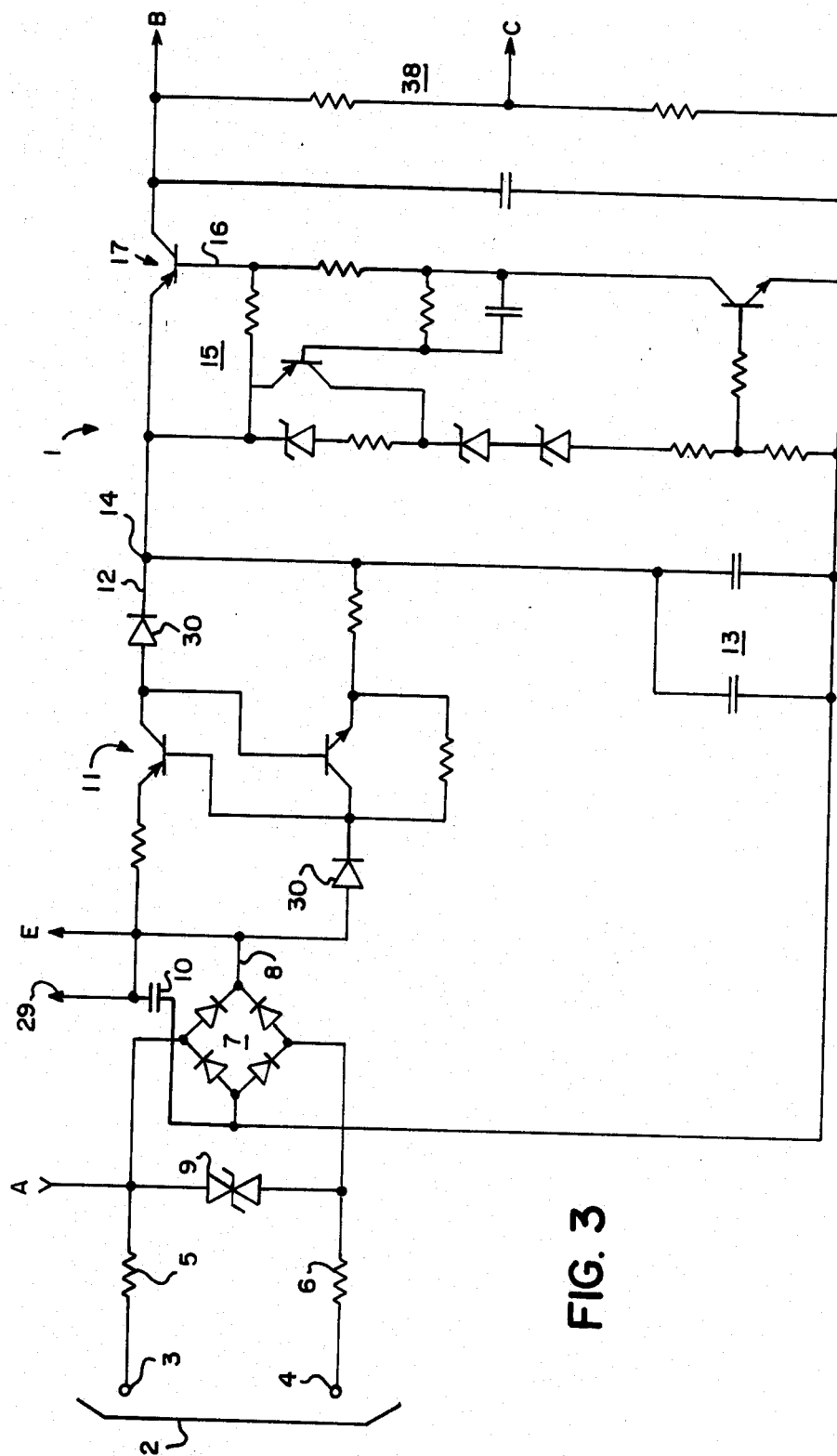
FIGS. 3-5 are schematic diagrams illustrating circuitry for embodying the block diagram shown in FIG. 1.
Figure 4:
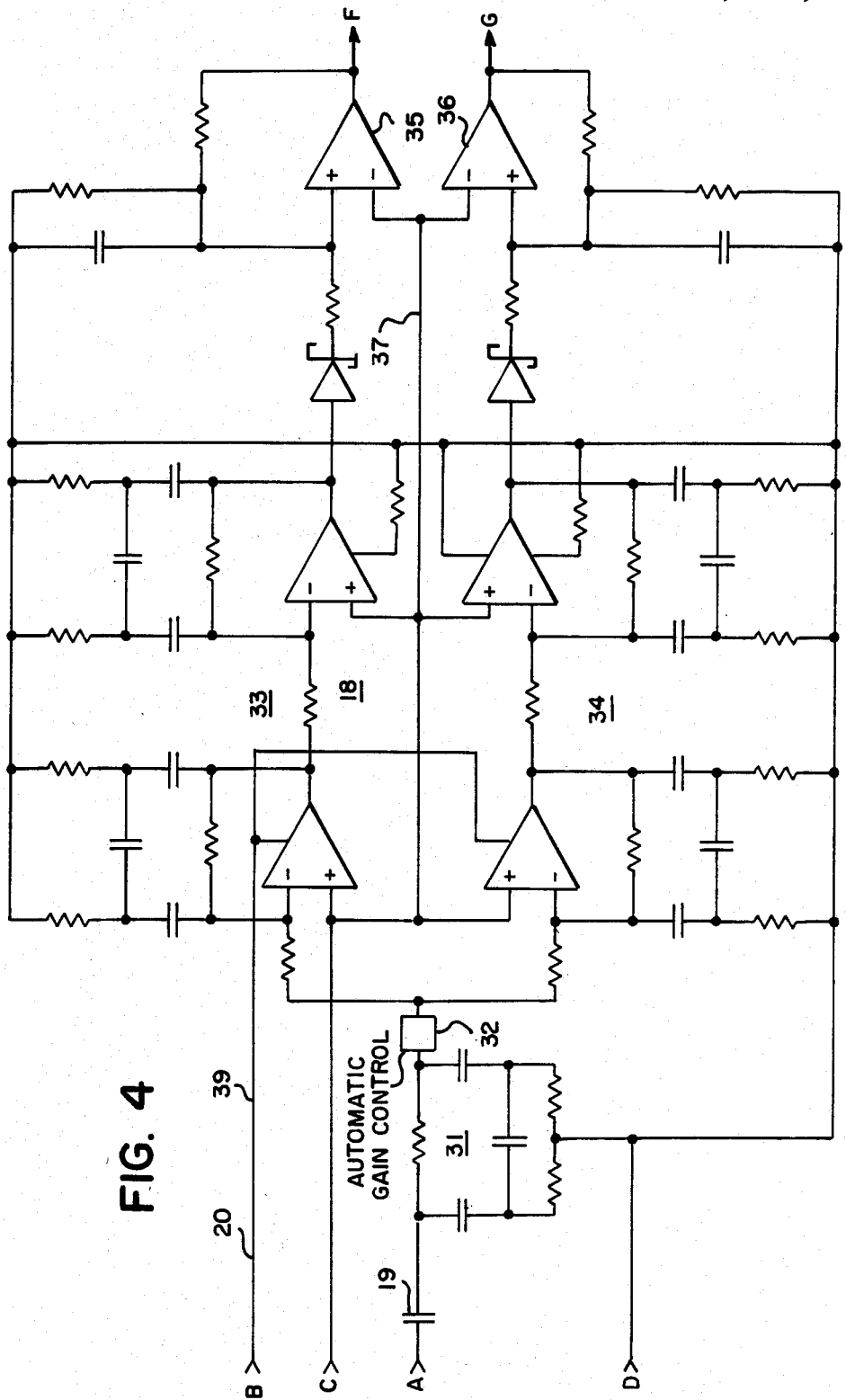
Figure 5:
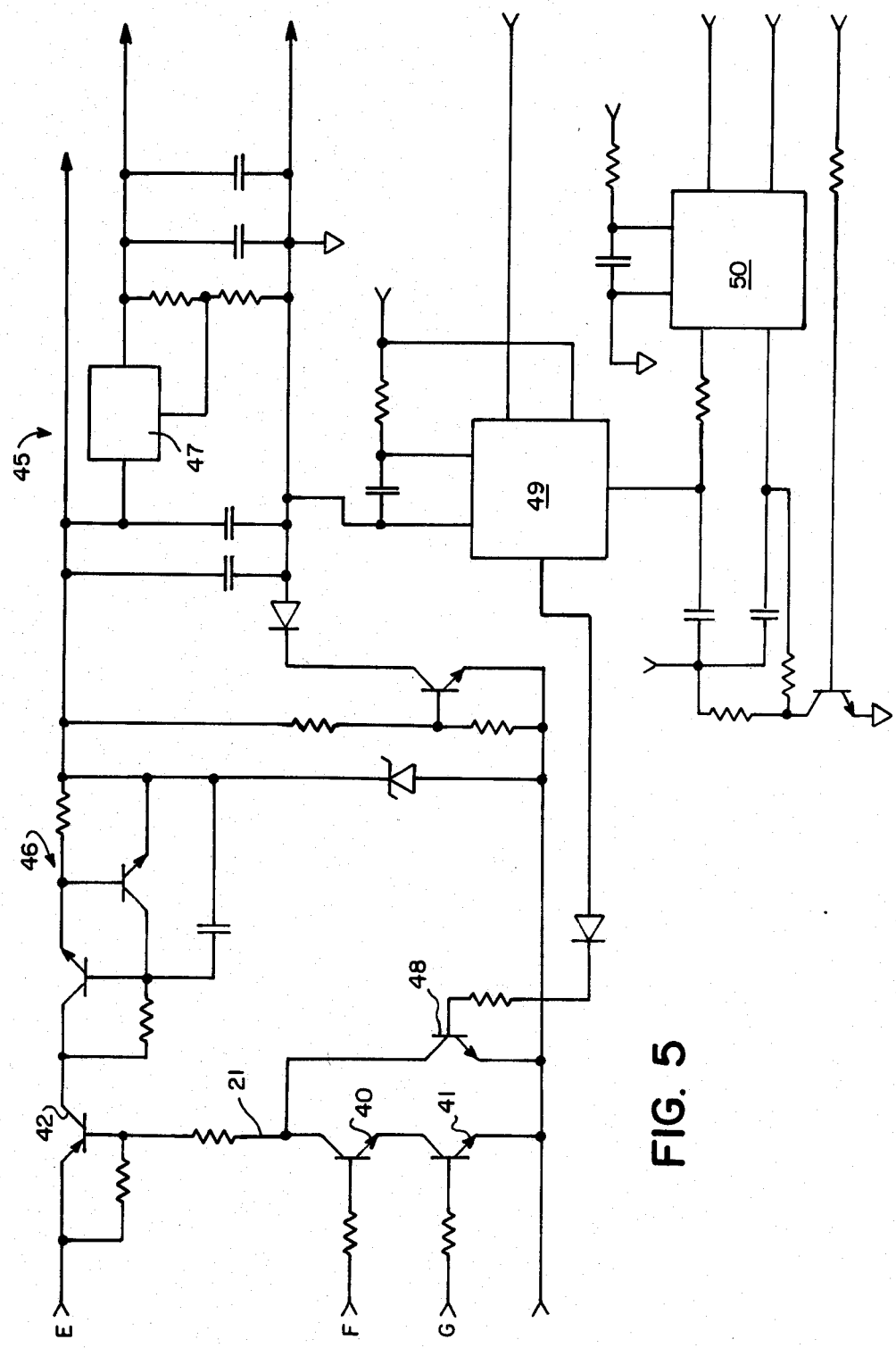

FIGS. 3-5 illustrate the circuitry which is generally described in FIG. 1 in greater detail, in connection with an application wherein the amount of current which may be drawn from the telephone line in its on-hook condition is limited to a value on the order of 100 microamps. Accordingly, FIG. 3 again shows a telephone line 2, across which has been placed a pair of loading resistors 5, 6, in series combination with a bridge circuit 7 as previously described, to develop a current at terminal 8. The current developed at terminal 8 is applied to the current source sub-circuit 11 as previously described. It will be noted that the current source sub-circuit 11 comprises light emitting diodes 30, which serve as a convenient means for developing a controlled and constant reference current useful in charging the capacitor 13 as previously described.

The voltage developed across the capacitor 13 is in turn applied to the charge voltage comparator sub-circuit 15, to monitor the voltage excursion developed at terminal 14; shown at 25 in FIG. 2 of the drawings. In response, the charge voltage comparator sub-circuit 15 develops an output (shown at 26 in FIG. 2) which is capable of operating the switch 17, here a switching transistor, on a periodic basis.

Activation of the switch 17 in turn serves to activate the tone detect sub-circuit 18, which is illustrated in FIG. 4. As previously described, the input of the circuit 1 is capacitively coupled to the input 20 of the tone detect sub-circuit 18. Input 20 is preferably provided with a 60 Hz filter 31, to eliminate noise, and an automatic gain control 32, to accommodate variations in level. The output of automatic gain control 32 is applied to each of a pair of two-stage tone filters 33, 34, which are configured to selectively detect a desired pair of tones which are to indicate a requested interrogation. The outputs of tone filters 33, 34 are respectively coupled to a pair of amplitude comparator circuits 35, 36, which compare the outputs of the tone filters 33, 34 against a reference voltage 37 which is developed by means of the voltage divider network 38 which is shown in FIG. 3 of the drawings. It will be noted that all of the foregoing circuitry operates from the current supplied by the capacitor 13, at 39, and does not require the use of any external power supply. It is for this reason that the use of micro-power circuit elements is preferred.

With reference to FIG. 5, the outputs of amplitude comparator circuits 35, 36 are respectively coupled to switching transistors 40, 41, which serve the function of an AND circuit. Accordingly, upon the application of each of two appropriate tones to the tone detect sub-circuit 18, a signal will be developed at 21 which serves to turn on a transistor 42, activating a circuit 45 for monitoring the instrumentality in question. Pertinent portions of such a monitoring circuit 45 are shown in FIG. 5.

To this end, a hook relay current circuit 46 is activated, to draw sufficient current from the telephone line 2 to assure that the telephone line assumes its off-hook condition; and appropriate voltages are developed by means of a voltage reference circuit 47, to initiate operation of the monitoring circuit 45. This initiates the interrogation process, which then proceeds in accordance with conventionally available, and otherwise known techniques.

In activating the tone-responsive circuit 1, care must be taken to assure that the selected interrogation-signaling tones are detected by the circuit 1 despite its periodic operation. Accordingly, it is preferred that the selected tones be presented to the circuit 1 for a period of time which is at least equal to the length of one complete charge/discharge cycle of the capacitor 13 (up to four seconds).

In activating the monitoring circuit 45, care must also be taken to maintain operation of the monitoring circuit 45 for a sufficient period of time to perform its functions. Since this period of time will normally exceed the period of time during which the interrogation tones are applied to the tone-responsive circuit 1, a maintenance transistor 48 is placed in parallel across the series combination of transistors 40, 41 to maintain the transistor 42 in its activated state throughout the interrogation process. Maintenance transistor 48 receives its input from a multivibrator circuit 49 which operates responsive to the activation of the monitoring circuit 45. A second multivibrator circuit 50 is provided to enable servicing of the system, in the absence of a detected interrogation sequence.

The above-described circuitry is intended for use in applications wherein prevailing telephone company regulations limit the current which may be drawn from the telephone line servicing the system, in the on-hook condition, to a value on the order of 100 microamps. However, often, prevailing telephone company regulations limit the current which may be drawn from the telephone line (on-hook) to a value on the order of 10 microamps. In such cases, the above-described circuitry will not be effective in achieving desired operation.

Figure 6:
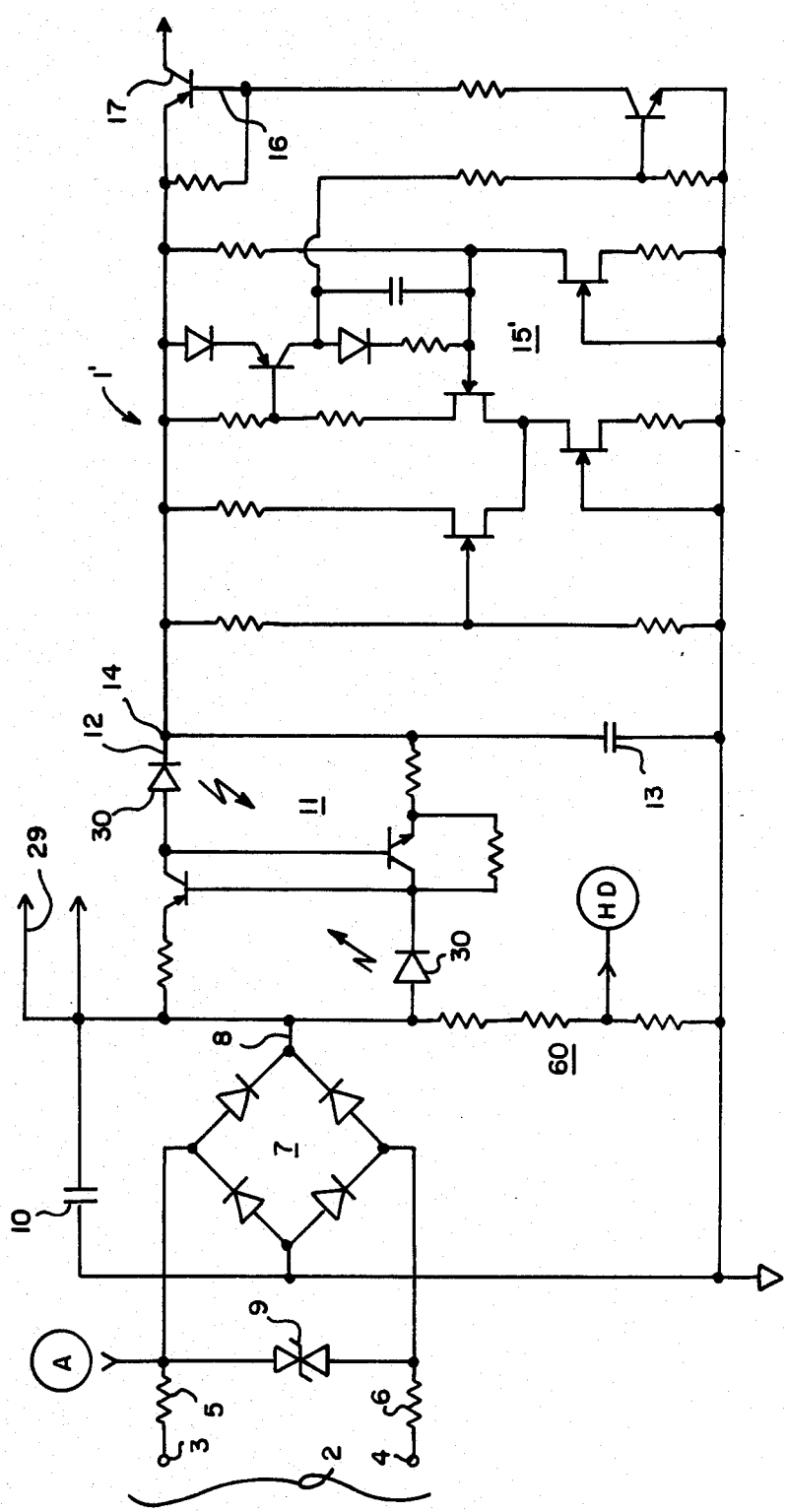
FIGS. 6-8 are schematic diagrams illustrating preferred circuitry for embodying the block diagram of FIG. 1.
Figure 7:
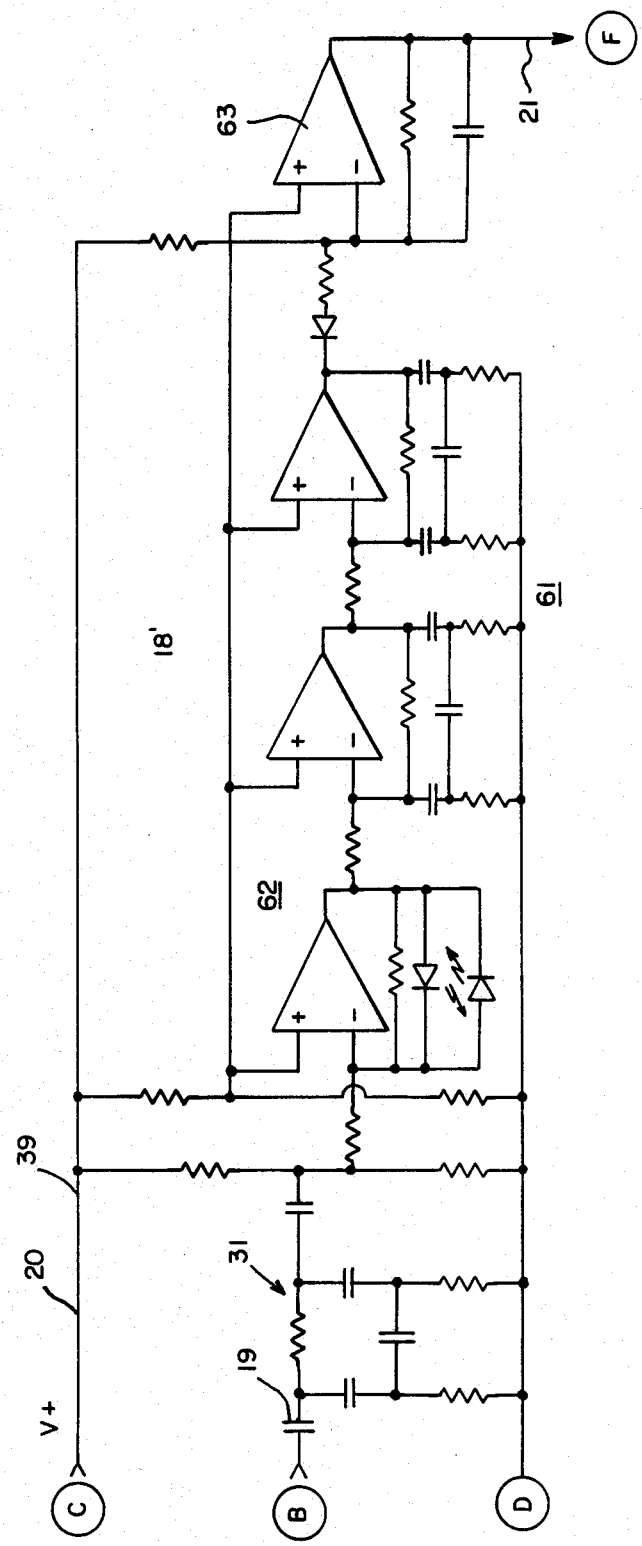
Figure 8:
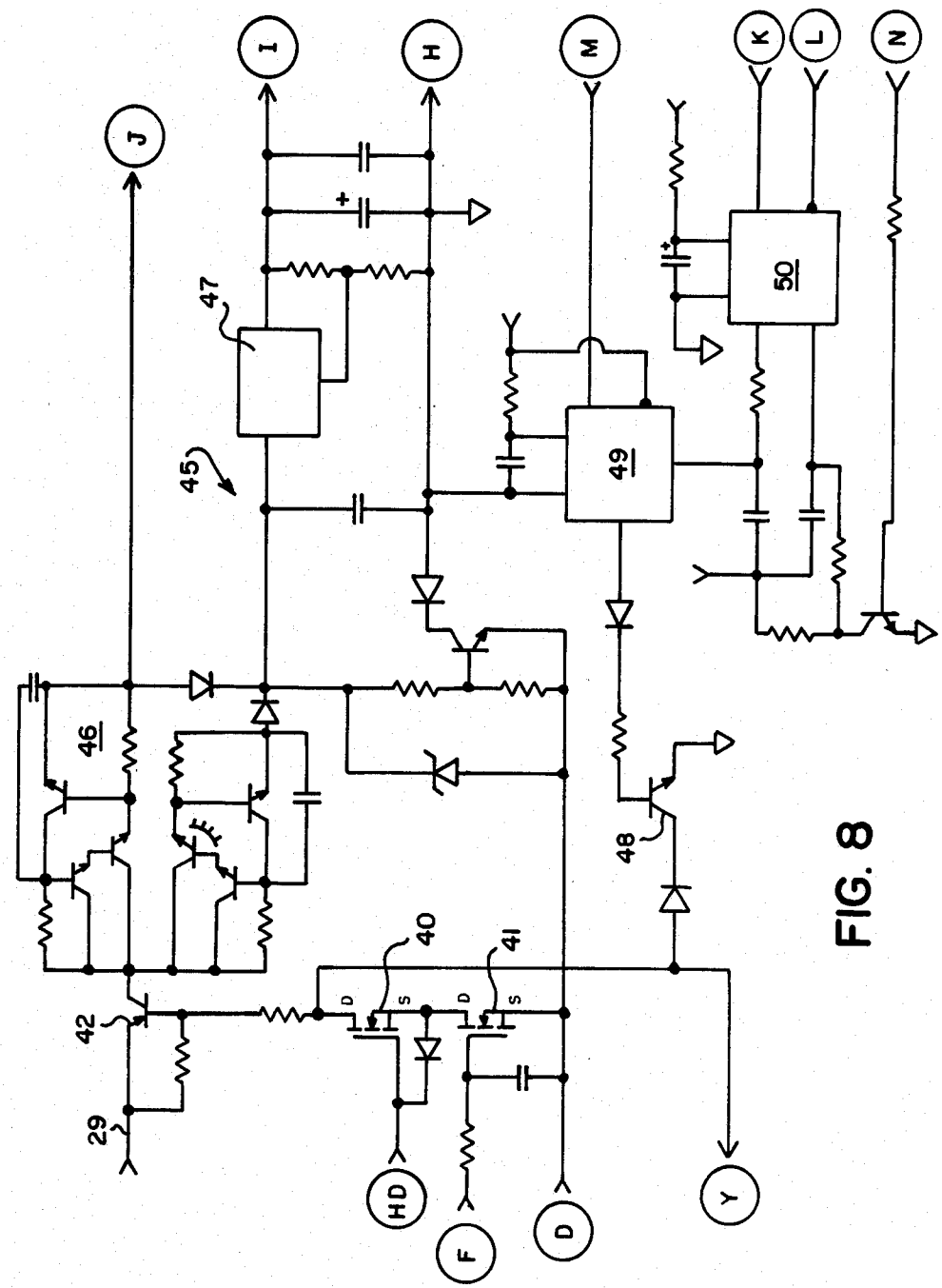

FIGS. 6-8 illustrate circuitry which is capable of operating in accordance with the present invention, even when prevailing telephone company regulations limit the current which may be drawn from the telephone line in its on-hook condition to a value less than 10 microamps. Since such circuitry is also capable of operating when increased currents are available, with improved efficiency, the following circuitry is preferred in accordance with the present invention.

As in the circuit 1 illustrated in FIGS. 3-5, the current source sub-circuit 11 again serves to limit the current which is drawn from the terminal 8. However, in the circuit 1' of FIGS. 6-8, this current is limited to 9.6 microamps. Charging of the capacitor 13 again causes a varying voltage to be developed at the terminal 14, in accordance with the characteristic curves illustrated in FIG. 2.

However, in the present embodiment, this change in voltage is monitored by a charge voltage comparator sub-circuit 15' which is comprised of field effect transistors, in place of the bipolar transistors and Zener diodes of the charge voltage comparator sub-circuit 15, to enable the sub-circuit 15' to operate at the lower current levels which are available.

Further as a result of the lower current levels which are available, there is now insufficient current to support a two-tone detection scheme as previously described. Accordingly, only one tone is used, and tone detect sub-circuit 18' operates to detect the single tone selected only if the telephone line 2 displays an on-hook status. This is sensed by a hook status detection sub-circuit 60 (see FIG. 6).

Tone detect sub-circuit 18' is a single channel, single tone filter 61, with an input squarer circuit 62 instead of an automatic gain control circuit. The squarer circuit 62 assures a uniform signal output amplitude over the entire range of specified input signal levels and power supply voltages. An output integrator 63 serves to detect signal level and duration at the selected frequency.

The output of integrator 63 serves to control (turn "on") a MOSFET switching transistor 41. If the telephone is on-hook, hook status detection sub-circuit 60 will serve to activate (turn "on") the MOSFET switching transistor 40, in turn activating the monitoring circuit 45 as previously described by means of the transistor 42.

It will therefore be seen that the foregoing serves well to achieve each of the objectives previously set forth. It will be understood that the foregoing is capable of variation without departing from the spirit and scope of the present invention. For example, as is apparent from the foregoing description, a variety of circuit implementations may be used to provide the functions of the current source sub-circuit 11, the charge voltage comparator sub-circuit 15 and the tone detect sub-circuit 18. Moreover, the switch 17 may take various forms, as desired. It will also be understood that the timing of the above-described circuit implementation is capable of variation, as needed. Lastly, it will be understood that any of a number of tone combinations (single or plural) may be used to activate the tone-responsive circuit 1 of the present invention, depending upon telephone company regulations, and depending upon the other, unrelated circuit elements which may be associated with the accessed telephone line.

For example, it will be understood that the tones selected to activate the tone-responsive circuit 1 must be selected so as not to correspond to those tones which are used in connection with the touch-tone dialing system of the telephone company. Also to be avoided are tones which correspond to those tones which are used in connection with other peripheral equipment, including Modem's, telephone answering devices, and the like. The following tone pairs have been identified by the various telephone companies as being appropriate for transmission over telephone lines without interfering with the operation of telephone equipment.

| Combination | Tone No. 1 | Tone No. 2 |
|---|---|---|
| 1 | 578.4 HZ | 485.0 HZ |
| 2 | 578.4 HZ | 375.2 HZ |
| 3 | 520.6 HZ | 375.2 HZ |
| 4 | 520.6 HZ | 330.5 HZ |
| 5 | 468.0 HZ | 330.5 HZ |

These tones have been selected by the telephone company for private use. For single tone applications, a tone may be selected from these lists as desired. For plural tone applications, tone pairs may be selected and intermixed in various combinations as desired. It is expected that additional tones and tone pairs will also become allocated by the telephone companies, which may be substituted for the above values. Such tones are freely selectable so long as they do not interfere with, or result in the activation of, other telephone or peripheral equipment associated with the system.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. For use in connection with a system for interrogating a remote instrumentality over a telephone line, responsive to an activation signal, an activation circuit comprising:
    input means communicating with said telephone line and adapted to receive operating currents and said activation signal from said telephone line;
    signal detecting means, for detecting the presence of said activation signal on said telephone line, and for causing the activation of said interrogating system in response to said detection;
    means for storing current received from said telephone line;
    means for limiting said received current to less than that required to operate said signal detecting means, operatively connecting said input means and said storage means;
    storage detecting means associated with said storage means, for detecting the storage of a selected amount of current, and for providing a triggering signal upon said detection; and
    switching means operatively connecting said storage means and said signal detecting means, for operating said signal detecting means responsive to said triggering signal.

2. The activation circuit of claim 1 wherein said triggering signal is periodic.

3. The activation circuit of claim 2 wherein said periodic signal continues until said activation signal is received.

4. The activation circuit of claim 2 wherein said storage element is a capacitor.

5. The activation circuit of claim 4 wherein said storage detecting means is a voltage level detection circuit.

6. The activation circuit of claim 4 wherein said current limiting means is a regulated current source.

7. The activation circuit of claim 6 wherein said periodic signal is a sawtooth.

8. The activation circuit of claim 7 wherein said triggering signal is a series of pulses.

9. The activation circuit of claim 8 wherein said pulses have a width of not less than 60 nor more than 200 milliseconds.

10. The activation circuit of claim 1 wherein said current is limited to not more than 9.6 microamps.

11. The activation circuit of claim 1 wherein said activation signal is a pair of tones.

12. The activation circuit of claim 11 wherein said signal detecting means is a tone detection circuit.

13. The activation circuit of claim 1 wherein said interrogation system further comprises means for monitoring said remote instrumentality upon the activation of said interrogation system.

14. The activation circuit of claim 13 wherein said monitoring means requires more than 9.6 microamps of current to operate.

15. The activation circuit of claim 1 wherein said telephone line assumes an on-hook condition when current drawn from said telephone line is maintained below a defined threshold, and wherein said current limiting means prevents the current drawn from said telephone line from exceeding said defined threshold.

16. The activation circuit of claim 15 wherein said defined threshold is 100 microamps.

17. The activation circuit of claim 6 wherein said defined threshold is 9.6 microamps.

18. The activation circuit of claim 15 wherein said telephone line is maintained in said on-hook condition until said signal detecting means detects the presence of said activation signal on said telephone line.

19. The activation circuit of claim 18 wherein said telephone line assumes an off-hook condition when current drawn from said telephone line exceeds said defined threshold, and wherein said telephone line is caused to assume said off-hook condition when said signal detecting means detects the presence of said activation signal.

20. The activation circuit of claim 19 wherein said telephone line is returned to said on-hook condition after said interrogation has been completed.

* * * * *